(12) United States Patent  (10) Patent No.: US 9,373,106 B1
Reeves et al.  (45) Date of Patent: Jun. 21, 2016

(54) TRACKING THE DOWNLOAD AND PURCHASE OF DIGITAL CONTENT

(75) Inventors: Raymond Emilio Reeves, Olathe, KS (US); Ryan Alan Wick, Apollo Beach, FL (US); Wen Xue, Overland Park, KS (US); Thomas M. Hughson, Boscawen, NH (US)

(73) Assignee: Sprint Communications Company L.P., Overland Park, KS (US)

( * ) Notice: Subject to any disclaimer, the term of this patent is extended or adjusted under 35 U.S.C. 154(b) by 1185 days.

(21) Appl. No.: 12/767,082

(22) Filed: Apr. 26, 2010

(51) Int. Cl.
G06F 21/00 (2013.01)
G06Q 20/12 (2012.01)
G06F 21/10 (2013.01)
G06F 17/30 (2006.01)

(52) U.S. Cl.
CPC ........ G06Q 20/123 (2013.01); G06F 17/30106 (2013.01); G06F 21/10 (2013.01); G06Q 2220/12 (2013.01)

(58) Field of Classification Search
CPC .................................................. G06Q 20/123
USPC .................................................. 705/901, 51
See application file for complete search history.

(56) References Cited

U.S. PATENT DOCUMENTS

| | | | |
|---|---|---|---|
| 5,892,900 A * | 4/1999 | Ginter et al. | 726/26 |
| 6,226,618 B1 * | 5/2001 | Downs et al. | 705/51 |
| 6,389,403 B1 * | 5/2002 | Dorak, Jr. | 705/52 |
| 6,697,948 B1 * | 2/2004 | Rabin et al. | 726/30 |
| 6,785,704 B1 * | 8/2004 | McCanne | 718/105 |
| 6,968,389 B1 * | 11/2005 | Menditto et al. | 709/233 |
| 7,010,578 B1 * | 3/2006 | Lewin et al. | 709/217 |
| 7,610,332 B2 * | 10/2009 | Barbir et al. | 709/203 |
| 7,770,198 B1 * | 8/2010 | Greene | H04N 21/2225 725/116 |
| 2002/0042796 A1 * | 4/2002 | Igakura | 707/205 |
| 2005/0181796 A1 * | 8/2005 | Kumar et al. | 455/445 |
| 2005/0192871 A1 * | 9/2005 | Galuten et al. | 705/26 |
| 2005/0198269 A1 * | 9/2005 | Champagne et al. | 709/224 |
| 2011/0010431 A1 * | 1/2011 | Rooks et al. | 709/218 |

OTHER PUBLICATIONS

White et al., "How Computers Work", Oct. 2003, Que, 7th Edition.*
J. Santiago et L. Vigneron. Study for Automatically Analysing Non-repudiation. Dans les actes du 1er Colloque sur les Risques et la Sécurité d'Internet et des Systèmes, CRiSIS, pp. 157-171, Bourges (France), Oct. 2005.

(Continued)

Primary Examiner — Steven Kim (57) ABSTRACT

Provides a consumer of digital products with an experience like that of visiting a shopping mall, where a product may be "tried on," or downloaded, without having to pay until it's actually used. A consumer may download three identical copies of an item, but not be billed for any of the downloads until one of the copies of the item is actually installed or used on the client device. At that point, a purchase of that particular copy of the item is deemed to have occurred and the user is billed for that particular copy. The sale is credited to the provider that the particular copy is associated with, based on a transaction identifier that associates that particular copy of the item with the client device and the provider. The unused copies of the item may automatically be deleted or disabled once the purchase has occurred.

20 Claims, 3 Drawing Sheets

(56) References Cited

OTHER PUBLICATIONS

Markowitch, et al., "An Optimistic Non-Repudiation Protocol with Transparent Trusted Third Party", Université Libre de Bruxelles, Département d'Informatique, CP 212 Boulevard du Triomphe, 1050 Bruxelles, Belgium, 2001.

Van Herreweghen, Els, "Non-repudiation in SET: Open Issues"; Lecture Notes in Computer Science; vol. 1962 archive Proceedings of the 4th International Conference on Financial Cryptography table of contents pp. 140-156; Year of Publication: 2000; ISBN:3-540-42700-7.

* cited by examiner

TRACKING THE DOWNLOAD AND PURCHASE OF DIGITAL CONTENT

SUMMARY

Embodiments of the invention are defined by the claims below, not this summary. A high-level overview of various aspects of the invention are provided here for that reason, to provide an overview of the disclosure, and to introduce a selection of concepts that are further described in the detailed-description section below. This summary is not intended to identify key features or essential features of the claimed subject matter, nor is it intended to be used as an aid in isolation to determine the scope of the claimed subject matter.

In one aspect, a set of computer-useable instructions provides a method for tracking online purchases. A tracking server receives a notification that a client device has selected an item of digital content that is offered for purchase by a provider. A transaction identifier is associated with transactions related to the item, the client device and the provider. The item, which is associated with the provider by way of the transaction identifier, is provided to the client device by the tracking server. The tracking server receives a usage notification from the client device when the item has been used by the client device. Based on the usage notification, a purchase of the item is deemed to have occurred. The tracking server notifies a settlement system of the purchase, and the settlement system reconciles payment associated with the purchase of the item.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Many types of digital products are available for download and purchase by consumers. For example, movies, music, books, screensavers, applications, ringtones, and magazines, as well as many others. A consumer may learn about digital products from various sources, including online, television, radio, and text messages sent to the user's phone. The consumer may then access the digital product through some type of client device such as an Internet-enabled mobile phone, personal digital assistant (PDA), laptop, or other device capable of receiving digital content over a network. For example, the consumer might select a link on a website that allows a digital product to be downloaded from a provider of digital products. Or, the consumer might see an ad on television and take note of a displayed link. The consumer may then follow that link on his or her mobile phone to the provider's website, where a link may be selected that enables the consumer to purchase and download the online product. Alternately, the consumer may view an ad that gives an address that an SMS text message may be sent to, from the consumer's phone, to purchase and download a digital product to the phone.

Typically, a consumer must pay for a digital product prior to, or at the time of, downloading the product. This is different than a consumer's experience when shopping for nondigital products, e.g., shopping for clothing at a traditional shopping mall. For example, a consumer may go into five shoe stores, try on an identical pair of shoes in each store, but only pay for the pair that he or she carries out the door. Currently, if a consumer downloads an identical digital product from five providers, the consumer must pay for the product five times, regardless of whether the consumer actually uses any of the products. Further, a consumer may purchase and download a digital product, then later deny that he or she ever received the product, or that the product was never used, and accordingly demand a refund of the purchase price.

Embodiments of the present invention provide a consumer of digital products with an experience more like that of visiting a shopping mall, where a product may be "tried on," or downloaded, without having to pay for the product until it's actually used, while providing a means of verifying when a purchase is actually made. For example, a consumer may download three identical copies of a song, but not be billed for any of the downloads until one of the copies of the song is actually played on the client device. At that point, a purchase of that particular copy of the song by the consumer is deemed to have occurred, and the user is then billed for that particular copy. The sale will be credited to the provider from which that particular copy was downloaded. The unused copies of the song that were downloaded may automatically be deleted or disabled once the purchase has occurred.

In order to determine that a purchase has occurred, it is important to know when a particular copy of a digital product is used by the consumer and which from provider the digital product was downloaded. Embodiments of the invention assign a unique transaction identifier to communication sessions between a consumer and a provider that relate to a particular item of digital content. The transaction identifier is also assigned to a particular downloaded copy of the item such that the downloaded copy can be associated with the provider when the item is deemed to have been purchased.

Embodiments of the invention provide a monitoring server, a tracking server, and a content manager. The monitoring server monitors interactions between a client device and a provider. When the client device initiates a download of a digital product from the provider, the monitoring server intercepts the transaction and decides whether to route the digital product from the provider to the tracking server, or simply identify the digital product to the tracking server. The monitoring server communicates with the tracking server and determines whether the tracking server has previously saved an identical copy of the digital product. If not, then the digital product from the provider will be routed to the tracking server.

The tracking server may also be referred to as a transaction-verification server, or any other name if it performs the same or similar function. It tracks and verifies transactions and purchases between client devices and providers. The tracking server will catalog the product and save a copy of it in a cache and associate it with an identifier that uniquely identifies the product. The identifier may be a hash value such that any byte-for-byte identical copy of the digital product would have the same identifier. In this way, it can be determined whether two digital products are identical by comparing their hash values. Thus, if a particular digital product is already stored in the cache, then there is no need to download it from the provider every time it is downloaded to a client device. On the other hand, if an identical copy of the digital product has already been saved, only a notification will be sent to the tracking server.

The digital product is then downloaded to the client device by the tracking server, along with the hash value that identifies the product and the transaction identifier that associates the product, the client device, and the provider. Each download to the device is tracked by the content manager that resides in the client device. The content manager may be part of the operating system of the client device in one embodiment.

The content manager keeps track of all lifecycle events associated with a downloaded digital product. Exemplary lifecycle events include download, installation, use, transfer to another device, and deletion of the digital product. The content manager also notifies the tracking server of lifecycle events. Because each downloaded digital product has a transaction identifier associated with it, lifecycle events for a particular copy of a digital product can be associated with a particular provider, even when identical copies of the product have been downloaded from other providers.

In embodiments of the invention, a digital product is deemed to have been purchased when it is used. As employed herein, the term "used" may refer to when the digital product is installed on the client device, when it is actually employed for its intended purpose, when it is transferred or copied to another device, or at the occurrence of some other lifecycle event based on rules associated with a particular copy of the digital product. The rules may be based at least on a generic set of rules, an agreement with the provider of a particular copy of a digital product, or a combination of both.

When the content manager notifies the tracking server of a lifecycle event signifying that a particular copy of a digital product has been used, the tracking server will notify a settlement system of the usage, or purchase, of that particular digital item from its associated provider. The settlement system will reconcile whatever payment is associated with the purchase of the digital product. For example, the purchase price may be billed to an account that is associated with the client device, and the amount or some portion thereof credited to the provider or the provider's account. Various arrangements may exist by which the provider pays for this service. There may be an associated fee that is a percentage of the purchase price, or a fixed fee, an annual fee, or some other arrangement. Upon being notified that the digital product has been used, the tracking server may also instruct the client device to perform an action with respect to any identical copies of the digital product that reside on the client device. For example, a provider may supply business rules that govern what happens to the provider's digital product in the event that an identical copy is purchased from another provider. In one instance, a provider may want its digital product to be deleted. In another instance, the provider may want its digital product to be disabled.

Figure 1:
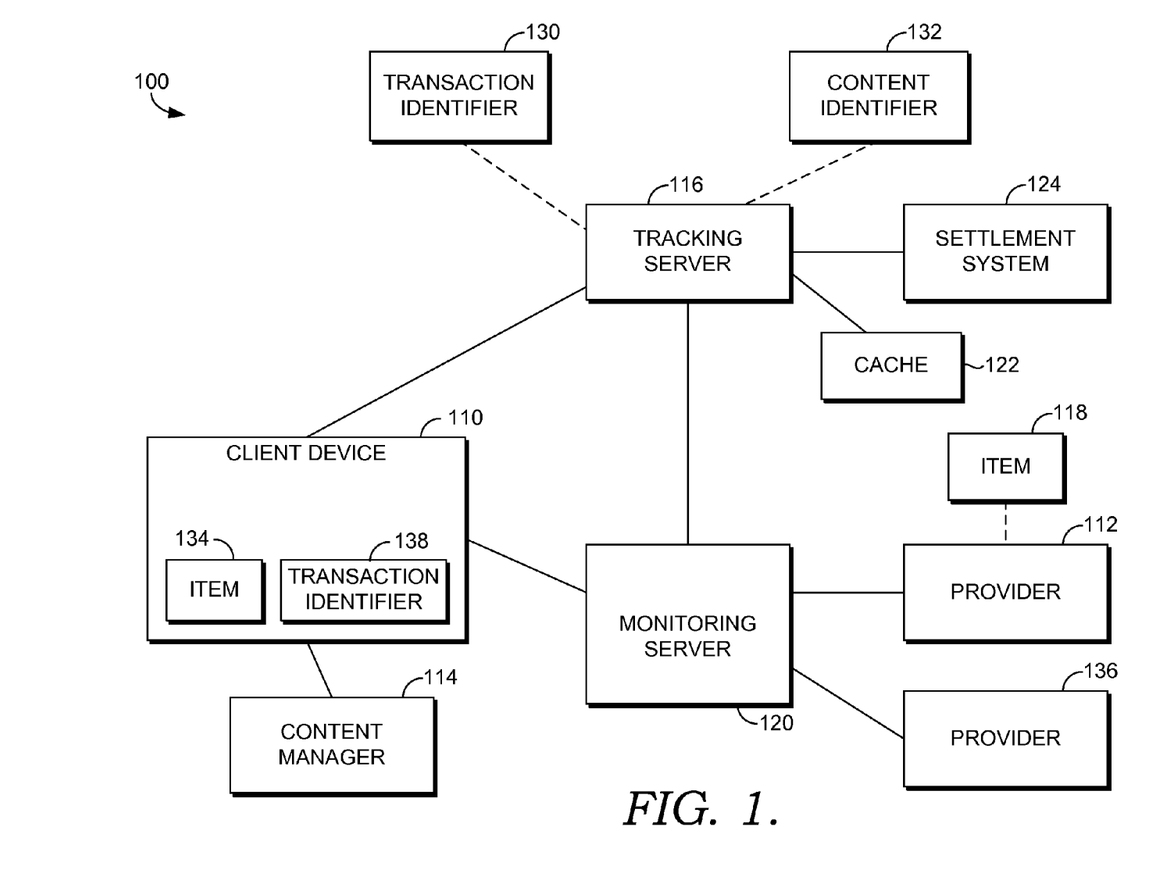
FIG. 1 depicts an environment for tracking online purchases in accordance with an embodiment of the present invention.

Referring now to FIG. 1, an environment is depicted in accordance with an embodiment of the present invention and is generally referred to as environment 100. Environment 100 is but one example of a suitable environment and is not intended to suggest any limitation as to scope of use or functionality. Neither should environment 100 be interpreted as having any dependency or requirement relating to any one or combination of components or modules illustrated.

In an embodiment of the invention, a client device 110 accesses web sites on a network, such as the Internet, associated with digital content providers such as providers 112 and 136. Examples of client device 110 include, but are not limited to, a mobile phone, PDA, laptop computer, desktop computer, and other devices that are capable of accessing a network. Client device 110 also communicates with a tracking server 116. Client device 110 includes, or has associated with it, a content manager 114.

Content manager 114 may be integrated into the operating system of client device 110 in one embodiment. Content manager 114 keeps track of lifecycle events associated with each item of digital content that is downloaded to client device 110. Exemplary lifecycle events may include download, installation, use, and deletion of digital content. Notifications of lifecycle events are reported by content manager 114 to tracking server 116.

Providers 112 and 136 are accessible via the network and offer digital content for download and purchase. For example, provider 112 may be associated with a website, or a website may be considered as the actual provider 112, or a website may be owned by provider 112. On the other hand, provider 112 may be one of many providers represented on a website. Alternately, rather than being associated with a website, provider 112 may be associated with a network address to which an email or text message is sent in order to initiate a download of digital content.

Associated with provider 112 is an item of digital content 118. Item 118 may include any type of digital content such as applications, games, music files, image files and video files. Item 118 may reside at a location of provider 112 in one embodiment. Item 118 may potentially reside anywhere on the network or in a storage facility accessible via the network in other embodiments. In one embodiment, when client device 110 selects item 118 for download, the actual delivery of item 118 to client device 110 may be handled by provider 112. In another embodiment the delivery of item 118 may be handled by an entity other than provider 112.

A monitoring server 120 monitors the network activity of client device 110, including interactions between client device 110 and provider 112, and detects when client device 110 attempts to download an item of digital content 118 from provider 112. Monitoring server 120 also redirects communication from provider 112 to tracking server 116. Monitoring server 120 may be a computer, a server, or other type of network device or computing device.

Tracking server 116 tracks communication sessions between client device 110 and provider 112, and assigns a transaction identifier to all communication sessions related to the combination of client device 110, provider 112, and a particular item of digital content such as item 118. Tracking server 116 also associates a content identifier 132 with a particular item of digital content, such that two items of digital content that are byte-for-byte identical will have identical content identifiers. An exemplary content identifier is a hash value that is generated based on the data in the digital content. In one embodiment, a hash value is generated in such a way that it is extremely improbable that two different items of digital content would have the same hash value. On the other hand, two identical items of digital content will always have the same hash value. Thus, if two items of digital content are determined to have the same hash value, it is assumed that the two items are byte-for-byte identical.

Tracking server 116 also communicates with monitoring server 120, a content cache 122, and a settlement system 124. Content cache 122 stores information that is used by tracking server 116. Exemplary information includes items of digital content, source addresses from where items of digital content may be obtained, content identifiers associated with items of digital content, and transaction identifiers. Settlement system 124 communicates with tracking server 116, receives notifications of purchases made by client device 110, and reconciles whatever payment is required.

Figure 2:
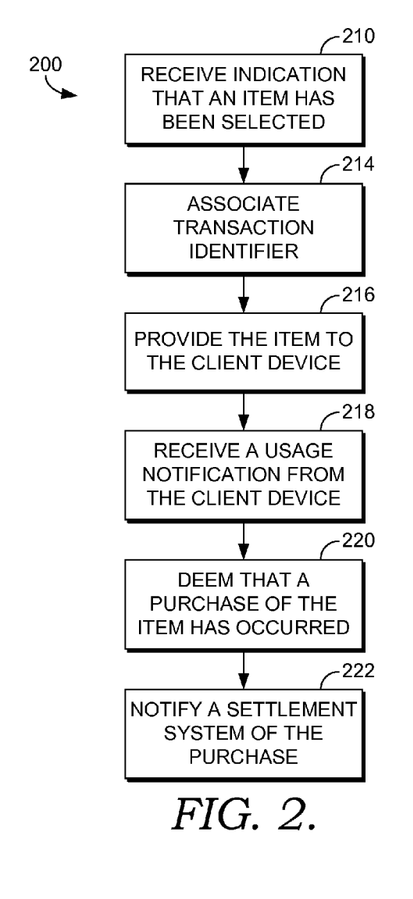
FIG. 2 depicts a method for tracking online purchases in accordance with an embodiment of the present invention.

Referring now to FIG. 2, a method is depicted in accordance with an embodiment of the present invention and is generally referred to as method 200. Method 200 is but one example of a suitable method and is not intended to suggest any limitation as to scope of use or functionality. Neither should method 200 be interpreted as having any dependency or requirement relating to any one or combination of components or modules illustrated.

With continued reference to FIG. 2, at a step 210, tracking server 116 receives a notification from monitoring server 120 that item of digital content 118 has been selected for purchase from provider 112 by client device 110. In an embodiment of the invention, the notification may include item 118 itself, a network address from which item 118 may be retrieved, or may include an identifier that identifies item 118. For example, if monitoring server 120 determines that tracking server 116 has already stored an identical copy of item 118 in content cache 122, then there is no need to send item 118 to tracking server 116.

If a copy of item 118 has not yet been stored in content cache 122, then tracking server 116 receives item 118 from monitoring server 120. In an embodiment of the invention, tracking server 116 retrieves item 118 from an address supplied by provider 112. Tracking server 116 stores item 188 and associates it with a content identifier 132. As discussed above, content identifier 118 is generated in such a way that any item of digital content that is byte-for-byte identical to item 118 has the same content identifier 132, and the likelihood that two non-identical items would have the same content identifier 118 is essentially zero. Once content identifier 132 has been associated with item 118, it can easily be determined whether another item of digital content is identical to item 118 by comparing the content identifiers of the two items.

Content cache 122 serves as a repository of items of digital content so that, once an item has been stored in content cache 122, tracking server 116 can provide the item to a client device without having to obtain the item from the provider or other source. In the event that tracking server 116 does not actually receive item 118 itself, i.e., the notification of item 118 is an address from where item 118 may be retrieved, then tracking server 116 may check a database of source addresses maintained in content cache 122 to determine whether a known item of digital content resides at that address. For example, if the notification of item 118 is a network address XYZ, then tracking server 116 will check the database of addresses in content cache 122 to determine whether address XYZ is stored there and whether there is a cached copy of item 118 associated with address XYZ. If so, then tracking server 116 can provide the cached identical copy of item 118 to client device 110. Logic can be implemented to verify on an ongoing or periodic basis that each known content address still has its particular item associated with it. In one embodiment, items of digital content may also be stored in content cache 122 at other times. For example, provider 112 may choose to provide items of digital content on a regular basis for inclusion in content cache 122.

At a step 214, tracking server 116 associates transaction identifier 130 with transactions, or communications, related to the combination of item 118, client device 110 and provider 112. The association of transaction identifier 130 with item 118 enables tracking server 116 to determine at a later time which provider is associated with the copy of item 118 that was downloaded to client device 110. This will be discussed further below.

At a step 216, tracking server 116 provides item 118 to client device 110. In an embodiment of the invention, the copy of item 118 that is provided to client device 110 may come from provider 112, from content cache 122, or from another location, yet still be associated with provider 112 based on the transaction identifier. For example, if item 118 is already stored in cache 122, then tracking server 116 can simply retrieve item 118 from cache 122 and send it to client device 110. On the other hand, if item 118 is not stored in cache 122, then tracking server may receive it from provider 112. In one embodiment, item 118 is received from provider 112 by way of monitoring server 120. Additionally, item 118 may be retrieved by tracking server 116 from an address that is provided by provider 112.

Once item 118 has been downloaded to client device 110, item 118 may be installed and used immediately, or it may remain on the device for some period of time before being installed or used, depending on the user. Or, item 118 may never be installed or used at all, if the user so chooses. When content manager 114 determines that item 118 has been used by the user, it notifies tracking server 116. At a step 218, tracking server 116 receives the notification that item 118 has been used. Whether or not item 118 has been used may be based on rules employed by content manager 114. The rules may be provided by provider 112, and may differ from one provider to the next. For example, one provider may consider an item of digital content to have been used, or purchased, once it has been installed on client device 110. Another provider may consider an item of digital content to have been used or purchased when the user actually uses the item, for instance, listening to a downloaded song or playing a downloaded game.

At a step 220, item 118 is deemed to have been purchased based on the usage notification from content manager 114. Transaction identifier 130, which is associated with item 118, allows the sale to be associated with provider 112.

At a step 222, settlement system 124 is notified by tracking server 116 that client device 110 (or the account associated with client device 110) has purchased item 118 from provider 112. Settlement system 124 reconciles whatever payment may be required in association with the purchase of item 118. For example, settlement system 124 may bill the cost of item 118 to the user account associated with client device 110. Once payment is received from the user, then settlement system 124 may transfer appropriate funds to provider 112. Settlement system 124 may collect a fee from provider 112 for the service, possibly as a percentage or fee per transaction, an annual fee, or whatever other arrangement may exist with provider 112.

Figure 3:
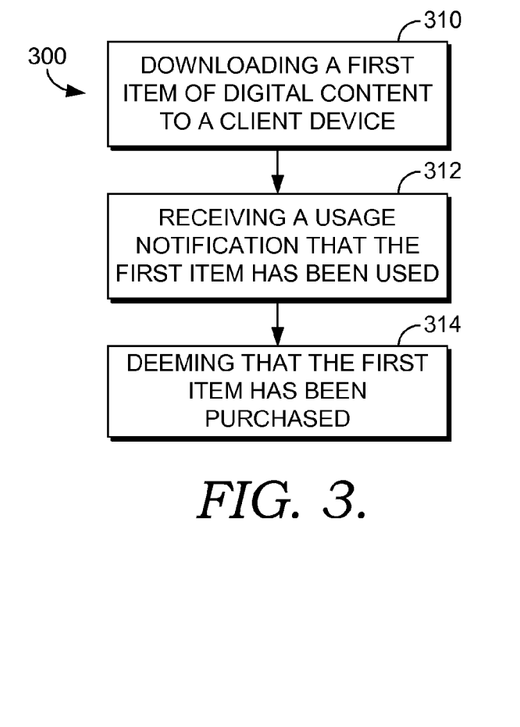
FIG. 3 depicts a method for tracking online purchases in accordance with an embodiment of the present invention.

Referring now to FIG. 3, a method is depicted in accordance with an embodiment of the present invention and is generally referred to as method 300. Method 300 is but one example of a suitable method and is not intended to suggest any limitation as to scope of use or functionality. Neither should method 300 be interpreted as having any dependency or requirement relating to any one or combination of components or modules illustrated.

With continued reference to FIG. 3, at a step 310, item of digital content 118 is downloaded to client device 110. Item 118 is associated with provider 112, i.e., item 118 is offered for sale by provider 112, and may be downloaded to prospective purchasers. Residing on client device 110 is an item of digital content 134. Item 134 is identical to item 118, but is associated with provider 136, and may have been downloaded to client device 110 either before or after item 118. The result is that client device 110 has two identical items of digital content that have been downloaded to it, and each item is associated with a different provider. The items are distinguishable from each other because each item, as downloaded, has associated with it a transaction identifier that was assigned by tracking server 116. Associated with item 118 is transaction identifier 130. Transaction identifier 130 associates item 118 with a transaction, or communication session, between client device 110 and provider 112. Associated with item 134 is transaction identifier 138. Transaction identifier 138 associates item 134 with a transaction between client device 110 and provider 136. When tracking server 116 downloads an item of digital content to client 110, it includes the item's associated transaction identifier. Thus, any item on client device 110 can be distinguished from an identical item with respect to which provider it is associated with.

Content manager 114, which is associated with client device 110, keeps track of lifecycle events associated with item 118 as discussed above, generates a usage notification when item 118 is used, and sends the usage notification to tracking server 116. At a step 312, tracking server 116 receives the usage notification from client device 110. Based on the usage notification, item 118 is deemed to have been purchased from provider 112 at a step 314.

Figure 4:
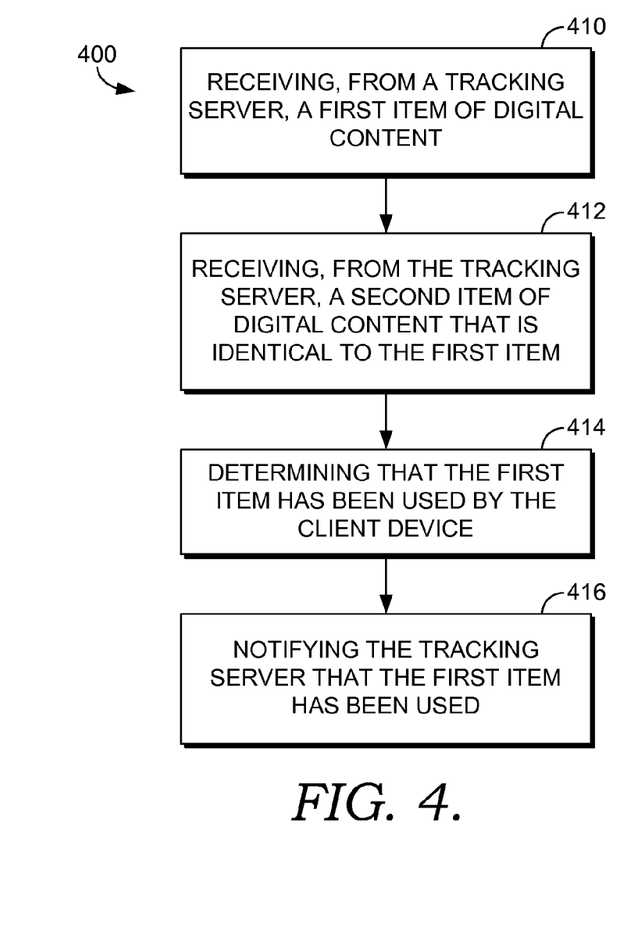
FIG. 4 depicts a method for tracking online purchases in accordance with an embodiment of the present invention.

Referring now to FIG. 4, a method is depicted in accordance with an embodiment of the present invention and is generally referred to as method 400. Method 400 is but one example of a suitable method and is not intended to suggest any limitation as to scope of use or functionality. Neither should method 400 be interpreted as having any dependency or requirement relating to any one or combination of components or modules illustrated.

A user may use his or her client device 110, for example, an Internet-enabled mobile phone, to navigate to a website associated with provider 112, and select item 118, a game application, for example, to download. With continued reference to FIG. 4, at a step 410, client device 110 receives item 118, which is associated with provider 112, from tracking server 116. Tracking server 116 tracks transactions between client devices and, when a client device selects an item for download, tracking server 116 provides the item to the client device. When a purchase is made, tracking server 116 verifies that the purchase was of a particular item, by a particular client device, from a particular provider.

The user may then navigate to a different website associated with provider 136, and download the exact same game application, item 134, which is byte-for-byte identical to item 118. At a step 412, client device 110 receives item 134, which is associated with provider 136, from tracking server 116.

At this point, neither item has been installed on the mobile phone; each has simply been downloaded. At some point, the user may choose to install one of the items, item 118, for example, and additionally may choose to run the installed item. At a step 414, content manager 114 determines that item 118 has been used. The determination is based on rules that may be derived from an agreement with provider 136. For example, item 118 may be deemed to have been used when it is installed; alternately, it may be deemed to have been used when it is actually run, or employed for its intended purpose.

At a step 416, content manager 114 notifies tracking server 116 that item 118 has been used. Content manager 114 may also delete or render useless any other identical copies of item 118 that are residing on client device 110.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more nontransitory computer-readable media having computer-executable instructions embodied thereon that, when executed by one or more computing devices associated with a service provider, cause the one or more computing devices to perform a method of tracking online purchases, the method comprising:

monitoring communication sessions between a client device and content providers;

assigning a first transaction identifier to communication sessions between the client device and a first provider that are associated with a first digital content that is available from the first provider, wherein the first transaction identifier is uniquely associated with a combination of the client device, the first provider, and the first digital content;

intercepting a request from the client device to the first provider for the first digital content;

obtaining the first digital content from the first provider;

storing the first digital content in a content cache;

downloading the first digital content to the client device, wherein downloading the first digital content to the client device includes downloading to the client device the first transaction identifier that associates the first digital content with the first provider;

assigning a second transaction identifier to communication sessions between the client device and a second provider that are associated with a second digital content that is available from the second provider, wherein the second transaction identifier is uniquely associated with a combination of the client device, the second provider, and the second digital content;

intercepting a request from the client device to the second provider for the second digital content;

determining that the second digital content is identical to the first digital content stored in the content cache;

obtaining a copy of the first digital content from the content cache based on the determination;

downloading the copy of the first digital content obtained from the content cache to the client device, wherein downloading the copy of the first digital content to the client device includes downloading to the client device the second transaction identifier, and wherein the first digital content is distinguishable from the copy of the first digital content based on a comparison of the first transaction identifier and the second transaction identifier;

receiving a usage notification from the client device based on the second transaction identifier that the copy of the first digital content associated with the second provider has been used; and upon receiving the usage notification, notifying a settlement system that a purchase of the second digital content associated with the second provider by a user of the client device has occurred based on the second transaction identifier.

2. The media of claim 1, the method further comprising:
based on the usage notification, instructing the client device to apply a business rule associated with the first provider to the first digital content.

3. The media of claim 2, wherein instructing the client device to apply the business rule includes instructing the client to render the first digital content unusable.

4. The media of claim 2, wherein instructing the client device to apply the business rule includes instructing the client to delete the first digital content.

5. The media of claim 1, wherein the determining is performed by using a hash technique.

6. The media of claim 1, the method further comprising:
wherein obtaining the first digital content from the first provider includes retrieving the first digital content from a source designated by the first provider in order to provide the first digital content to the client device.

7. The media of claim 6, the method further comprising:
communicating with a monitoring server that performs the monitoring of communication sessions between the client device and the content providers;
retrieving the first digital content from the source via the monitoring server.

8. A method for service provider tracking of online purchases, comprising:
monitoring communication sessions between a client device and content providers;
assigning a first transaction identifier to communication sessions between the client device and a first provider that are associated with a first digital content that is available from the first provider, wherein the first transaction identifier is uniquely associated with a combination of the client device, the first provider, and the first digital content;
intercepting a request from the client device to the first provider for the first digital content;

obtaining the first digital content from the first provider;
storing the first digital content in a content cache;
downloading the first digital content to the client device, wherein downloading the first digital content to the client device includes downloading to the client device the first transaction identifier that associates the first digital content with the first provider;

assigning a second transaction identifier to communication sessions between the client device and a second provider that are associated with a second digital content that is available from the second provider, wherein the second transaction identifier is uniquely associated with a combination of the client device, the second provider, and the second digital content;

intercepting a request from the client device to the second provider for the second digital content;

determining that the second digital content is identical to the first digital content stored in the content cache;

obtaining a copy of the first digital content from the content cache based on the determination;

downloading the copy of the first digital content obtained from the content cache to the client device, wherein downloading the copy of the first digital content to the client device includes downloading to the client device the second transaction identifier, and wherein the first digital content is distinguishable from the copy of the first digital content based on a comparison of the first transaction identifier and the second transaction identifier;

receiving a usage notification from the client device based on the second transaction identifier that the copy of the first digital content associated with the second provider has been used; and upon receiving the usage notification, notifying a settlement system that a purchase of the second digital content associated with the second provider by a user of the client device has occurred based on the second transaction identifier.

9. The method of claim 8, further comprising:
based on the usage notification, instructing the client device to apply a business rule associated with the first provider to the first digital content.

10. The method of claim 9, wherein instructing the client device to apply the business rule includes instructing the client to render the first digital content unusable.

11. The method of claim 9, wherein instructing the client device to apply the business rule includes instructing the client to delete the first digital content.

12. The method of claim 8, wherein the determining is performed by using a hash technique.

13. The method of claim 8, further comprising:
wherein obtaining the first digital content from the first provider includes retrieving the first digital content from a source designated by the first provider in order to provide the first digital content to the client device.

14. The method of claim 13, further comprising:
communicating with a monitoring server that performs the monitoring of communication sessions between the client device and the content providers; and
retrieving the first digital content from the source via the monitoring server.

15. A system for service provider tracking of online purchases, comprising:
a monitoring server programmed to:
A) monitor communication sessions between a client device and content providers, B) intercept a first request from the client device to a first provider for a first digital content and send a first notification of the first request to a tracking server, and intercept a second request from the client device to a second provider for a second digital content and send a second notification of the second request to the tracking server;

the tracking server programmed to:
A) assign a first transaction identifier to communication sessions between the client device and the first provider that are associated with a first digital content that is available from the first provider, wherein the first transaction identifier is uniquely associated with a combination of the client device, the first provider, and the first digital content,
B) in response to receiving the first notification from the monitoring server, obtain the first digital content from the first provider,
C) store the first digital content in a digital content cache,
D) download the first digital content and the first transaction identifier that associates the first digital content with the first provider to the client device,
E) assign a second transaction identifier to communication sessions between the client device and the second provider that are associated with a second digital content that is available from the second provider, wherein the second transaction identifier is uniquely associated with a combination of the client device, the second provider, and the second digital content,
F) in response to receiving the second notification from the monitoring server, determine that the second digital content is identical to the first digital content stored in the content cache,
G) obtain a copy of the first digital content from the content cache based on the determination that the second digital content is identical to the first digital content stored in the content cache,
H) download the copy of the first digital content obtained from the content cache to the client device, wherein downloading the copy of the first digital content to the client device includes downloading to the client device the second transaction identifier, and wherein the first digital content is distinguishable from the copy of the first digital content based on a comparison of the first transaction identifier and the second transaction identifier,
I) receive a usage notification from the client device based on the second transaction identifier that the copy of the first digital content associated with the second provider has been used, and
J) in response to receiving the usage notification, notify a settlement system that a purchase of the second digital content associated with the second provider by a user of the client device has occurred based on the second transaction identifier.

16. The system of claim 15, wherein the tracking server is further programmed to, based on the usage notification, instruct the client device to apply a business rule associated with the first provider to the first digital content.

17. The system of claim 16, wherein an instruction to the client device to apply the business rule includes an instruction to render the first digital content unusable.

18. The system of claim 15, wherein the determination is performed by using a hash technique.

19. The system of claim 15, wherein the tracking server is further programmed to retrieve the first digital content from a source designated by the first provider in order to provide the first digital content to the client device.

20. The system of claim 19, wherein the tracking server is further programmed to:
A) communicate with the monitoring server that monitors of communication sessions between the client device and the content providers, and
B) retrieve the first digital content from the source via the monitoring server.

* * * * *